(Model.)
D. A. GREEN.
Thill Coupling.
No. 236,802.       Patented Jan. 18, 1881.
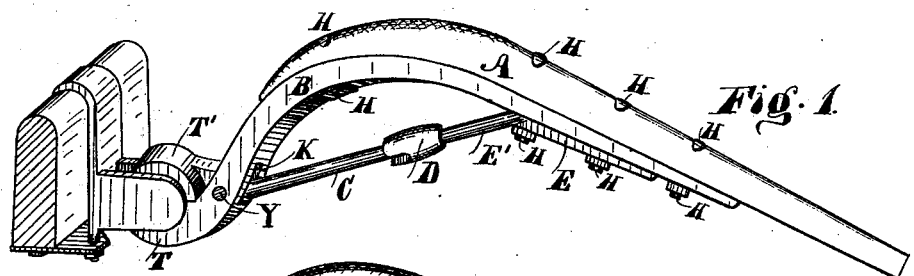
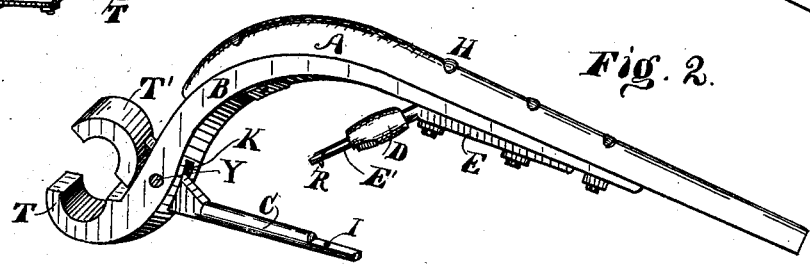
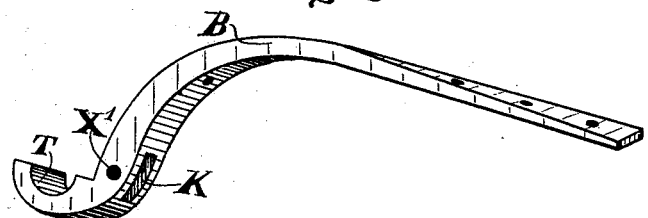
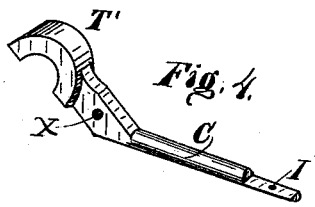
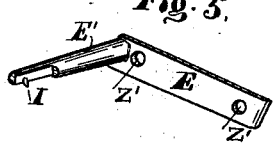
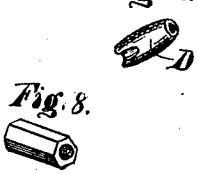
WITNESSES:
Edwin Farrer
John Q. Thomas
INVENTOR:
David A. Green.

UNITED STATES PATENT OFFICE.

DAVID A. GREEN, OF RUSHVILLE, INDIANA.

THILL-COUPLING.

SPECIFICATION forming part of Letters Patent No. 236,802, dated January 18, 1881.

Application filed January 27, 1880.

*To all whom it may concern:*

Be it known that I, DAVID A. GREEN, of Rushville, in the county of Rush and State of Indiana, have invented a new and useful Improvement for Attaching Thills or Poles to Carriages and other Vehicles, of which the following is a specification.

The invention relates to an adjustable thill-iron.

Heretofore such irons have been made with an eye through which the bolt that connects it with the clip passes, and rubber or other substances are introduced between the ears of the clip, which bears hard against the end of the thill-iron, thus preventing it from rattling. This method is objectionable for the reason that the thill can only be detached by first removing the bolt that connects the thill with the clip, which is difficult, owing to the pressure on the bolt caused by the rubber. It is also objectionable for the reason that frequent attaching and detaching spoils the thread of the bolt, and the motion of the vehicle causes the nut to work off. Another objection is, that it is difficult to overcome the wear on the inner surface of the eye.

The object of my invention is to provide a thill-iron by which the thill may be easily attached or detached, the eye of which can be readily adjusted to the clip-bolt and wear and rattling overcome.

In the accompanying drawings, in which similar letters of reference indicate like parts, Figure 1 is a perspective of a device embodying my invention attached to a section of axle by a common thill-clip. Fig. 2 is the same detached from the clip. Fig. 3 is a detail view of a thill-iron; Fig. 4, a detail view of a lever. Fig. 5 is a brace-rod; Fig. 6, a metal band; Fig. 7, a modified lever; Fig. 8, a modified metal band.

The thill-iron B is secured to the wooden thill A by bolts or rivets H, Fig. 1, and has a projection, T, at its lower end, which is concave on its upper side, as shown in Fig. 3, and is provided with a suitable slot, K, to receive lever C, Fig. 4, which is also provided with a projection, T', at its lower end, made concave on its under side, and is provided with a hole, X, to coincide with the hole X', Fig. 3. The rivet Y, Fig. 2, serves to hold the lever C in its proper place, and also as a fulcrum for the same. The metal brace E, Fig. 5, is secured to the under side of the thill-iron B by bolts or rivets H, Fig. 1, passing through the holes Z', Fig. 5, and is made at its inner or lower end, E', of suitable size and shape to conform to the size and shape of the inner or upper end of the lever C. These ends are locked by means of various devices, one of which is shown. The inner end of the brace E, Fig. 2, is made flat on the under side, and the inner end of the lever C is made flat on the upper side, and provided with a hole, I, into which the pin R enters. The band D, being drawn downward over the end of the lever C, as shown in Fig. 1, serves to hold the lever in its place, thus closing the concave projection T' firmly against the projection T, and forming a perfect eye to receive the clip-bolt.

The modified form in Fig. 7 is the same as Fig. 4, except that it is provided with threads at its inner end. The modified band, Fig. 8, is the same as in Fig. 6, except that it is provided with threads on its inner surface.

The operation of my device is as follows: When attached to the clip, as shown in Fig. 1, the band D is pressed upward far enough to free the inner end of the lever C, which, dropping downward, causes the lower end of the thill-iron B and lever C to separate, thus releasing it from the clip.

Having thus described my invention, what I claim is—

1. In a thill-coupling, the combination, with the thill-iron B, constructed with the slot K and provided with the concave jaw T, arranged as shown, of the pivoted concave jaw T', having the lever-arm C, the said lever-arm being passed through and pivoted in the slot K, operated and secured by suitable means on the under side of the thill, substantially as set forth.

2. In combination with the thill-iron B and lever C, connected by rivet Y, the brace-arm E and the band D, substantially as described.

DAVID A. GREEN.

Attest:
JOHN Q. THOMAS,
EDWIN FARRER.